United States Patent [19]

Arnold et al.

[11] Patent Number: 5,207,120
[45] Date of Patent: May 4, 1993

[54] ASSEMBLED CRANKSHAFT

[75] Inventors: Philip D. Arnold, Mt. Clemens; Roy G. Kaywood, Stockbridge, both of Mich.

[73] Assignee: General Motors Corporation, Detroit, Mich.

[21] Appl. No.: 902,439

[22] Filed: Jun. 18, 1992

Related U.S. Application Data

[63] Continuation of Ser. No. 753,553, Sep. 3, 1991.

[51] Int. Cl.$^5$ .................................................. F16C 3/00
[52] U.S. Cl. ................................ 74/595; 29/888.08; 74/603
[58] Field of Search ............... 74/595, 597, 598, 603; 123/192.1; 29/888.08

[56] References Cited

U.S. PATENT DOCUMENTS

| | | | |
|---|---|---|---|
| 2,364,109 | 12/1944 | Taylor | 29/6 |
| 2,730,912 | 1/1956 | Marinelli | 74/597 |
| 3,296,886 | 1/1967 | Reinhart, Jr. | 74/572 |
| 3,309,941 | 3/1967 | Kappel | 74/597 |
| 3,999,277 | 12/1976 | Hamada | 74/567 X |
| 4,046,028 | 9/1977 | Vachris | 74/603 X |
| 4,342,236 | 8/1982 | Everts | 74/603 |
| 4,554,893 | 11/1985 | Vecellio | 123/41.83 |
| 4,597,365 | 7/1986 | Madaffer | 74/567 X |
| 4,622,864 | 11/1986 | Fetouh | 74/597 |
| 4,708,029 | 11/1987 | Urano | 74/567 |
| 4,763,503 | 8/1988 | Hughes et al. | 72/57 |
| 4,809,562 | 3/1989 | Bendoraitas et al. | 74/567 |
| 4,835,832 | 6/1989 | Arnold et al. | 29/523 |
| 4,838,116 | 6/1989 | Saito et al. | 74/595 |
| 4,841,627 | 6/1989 | Arnold et al. | 29/720 |
| 4,875,270 | 10/1989 | Krips et al. | 29/421.1 |
| 4,922,785 | 5/1990 | Arnold et al. | 74/567 |
| 4,993,282 | 2/1991 | Swars | 74/567 |
| 5,067,369 | 11/1991 | Taniguchi | 74/567 |
| 5,081,884 | 1/1992 | Cheng et al. | 74/595 |
| 5,085,099 | 2/1992 | Hughes | 74/567 |
| 5,088,345 | 2/1992 | Kemmler et al. | 74/598 |

FOREIGN PATENT DOCUMENTS

| | | |
|---|---|---|
| 127093 | 6/1968 | Fed. Rep. of Germany . |
| 3803683C2 | 8/1989 | Fed. Rep. of Germany . |
| 3809369 | 9/1989 | Fed. Rep. of Germany . |
| 60-37411 | 2/1985 | Japan . |
| 1423831A1 | 9/1988 | U.S.S.R. . |
| 724025 | 2/1955 | United Kingdom . |

Primary Examiner—Rodney H. Bonck
Assistant Examiner—Andrea Pitts
Attorney, Agent, or Firm—Robert J. Outland

[57] ABSTRACT

A tubular shaft has a portion of reduced inner diameter at a location where joining to an apertured member is desired. The aperture in the member is lobed with splines in the lobes and has an undercut groove, or groove and is hardened. The shaft is inserted in the aperture and the reduced inner diameter portion is expanded to force the shaft material into the lobes and groove and around the splines to form a connection which resists torque and axial separation. The tube expansion is effected by forcing a series of balls through the reduced diameter portion, each ball being slightly larger than the reduced diameter and larger than the previous ball but smaller than the remainder of the shaft I.D. A crankshaft is assembled with this method wherein counterweights have lobed apertures to receive end portions of crank pins and main journals having reduced I.D.'s. Lubricating passages are formed in crankshafts having main journals and crank pins with reduced end portions defining planar shoulders on their body portions and annular grooves on the shoulders, bores in the crank arms intersecting the annular grooves on the adjacent shoulders, and passages in each bearing and crank pin connecting its annular groove with the surface thereof.

15 Claims, 4 Drawing Sheets

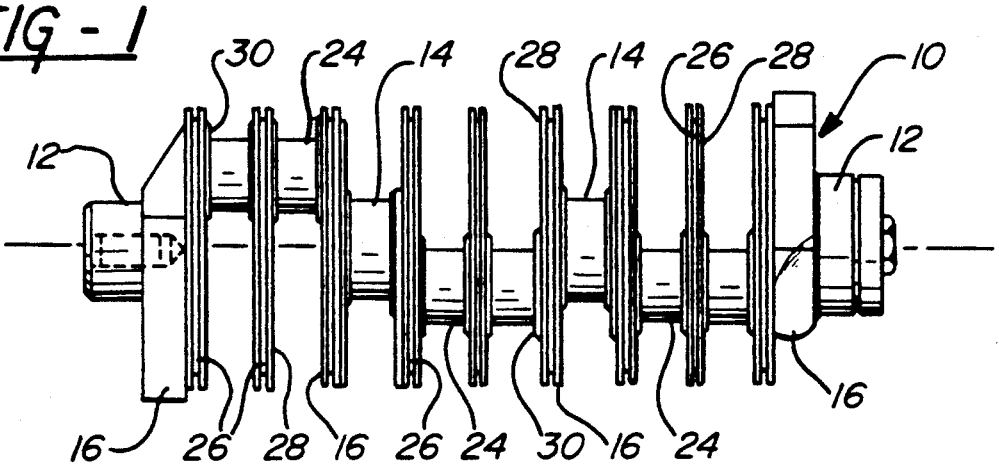
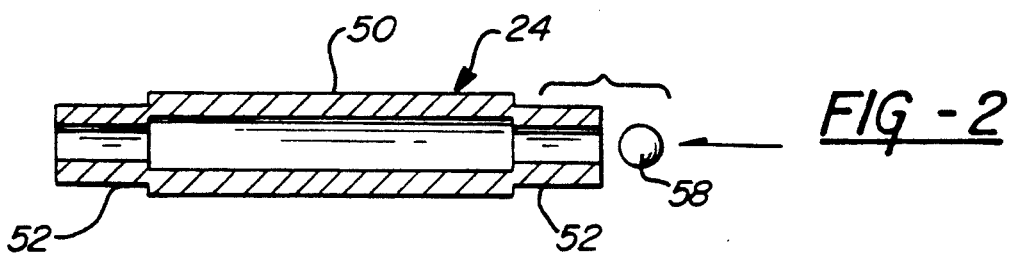
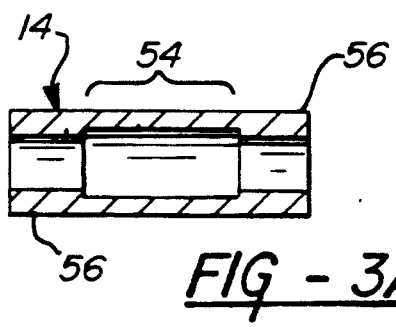
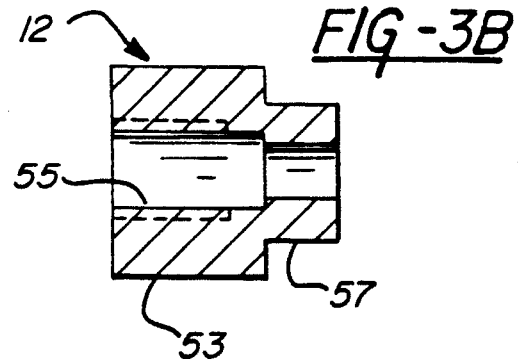
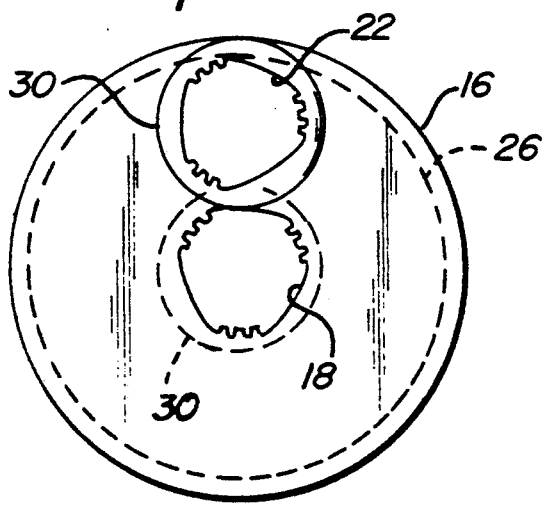
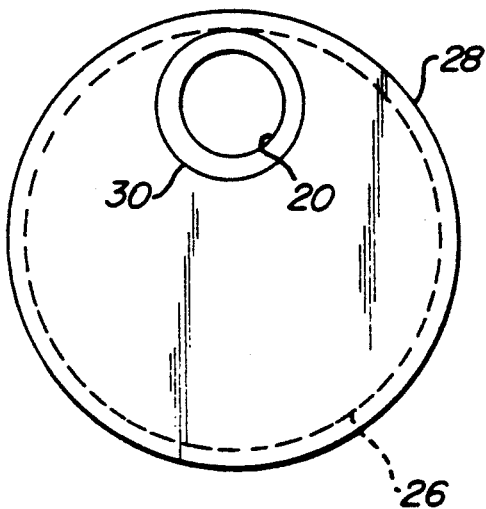

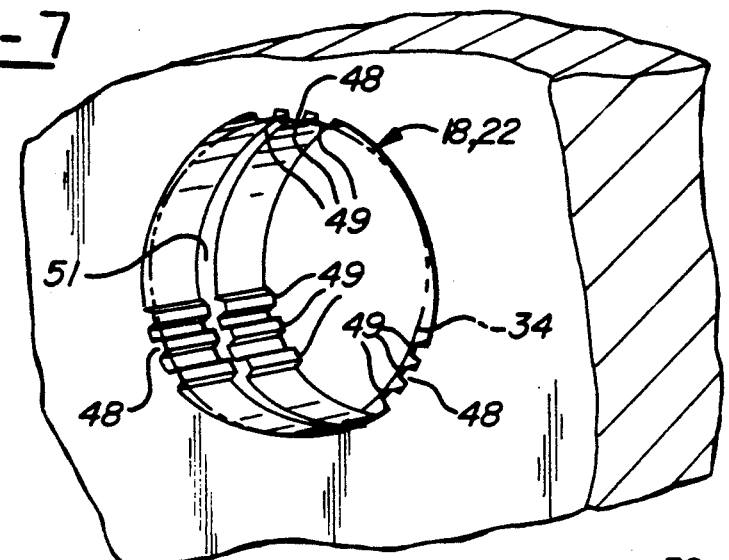
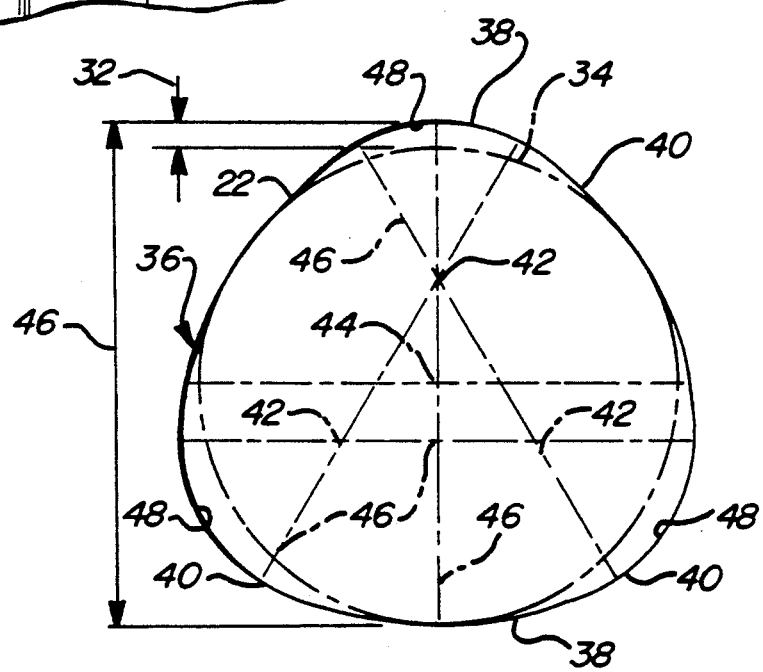
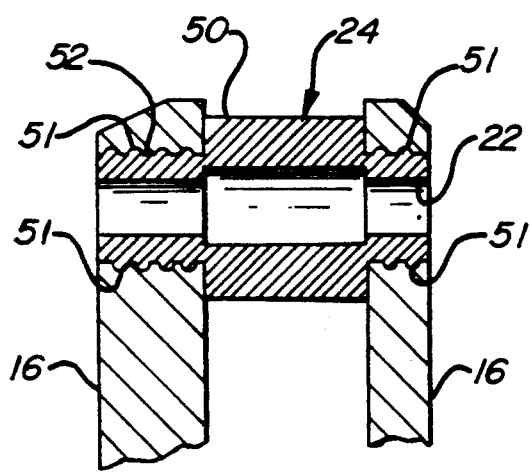
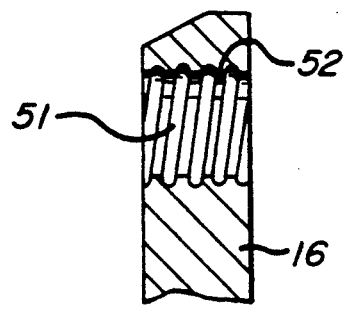

ASSEMBLED CRANKSHAFT

This is a continuation of application Ser. No. 07/753,553 filed on Sep. 3, 1991.

TECHNICAL FIELD

This invention relates to crankshafts and particularly to crankshafts assembled from individual machined parts.

BACKGROUND

It is known in the art relating to crankshafts for internal combustion engines to make one-piece castings or forgings which entails considerable machining to remove large quantities of excess metal to define crank pins, main journals, and crank arms which may include counterweights. When the crankshaft is intended for use in a two stroke engine, seal plates must also be provided which requires substantially more machining if the entire crankshaft is to remain as one piece, or otherwise the seal plates must somehow be separately assembled.

It is also known that by assembling the crankshaft of many separate elements much of the machining can be eliminated and the remaining machining is performed on small simple elements such as pins, journals, crank arms and seal plates. The elements are then joined by bolting together or by press fit, for example, to assemble the entire crankshaft. The best way of joining the elements depends on the particular application or load requirements of the assembly. One type of joint, such as main journals to crank arms connection, may be assembled by one method while the crank pins, for example, could be joined to crank arms by another method.

A simple and effective method of joining parts on a common shaft is shown in U.S. Pat. No. 4,835,832 to Arnold et. al., entitled "Method of Assembling Tubular Shaft Assemblies", which is incorporated herein by reference. This method, sometimes known as "ballizing", comprises positioning hollow parts, such as cams of a camshaft, on a tube and expanding the tube to hold the parts by clamping the ends of the tube to prevent longitudinal growth and forcing a ball through the tube which is larger than the original tube inner diameter. The hollow parts have a lobular inner cross section to receive the expanded tube outer diameter and include splines to hold the part against rotation on the tube.

Development work on extending the ballizing method to the joining of crankshaft parts has led to a second generation ballizing method which is improved, at least for some applications, over that disclosed in U.S. Pat. No. 4,835,832. This improved joining method can be used advantageously for joining crank pins and/or main journals to crank arms, yielding an assembled crankshaft with a new and improved joint structure.

An additional advantage of an assembled crankshaft over a one-piece crankshaft is that oil passage design is more flexible, using shorter passages and passages which are normal to the surface at entry or exit points, thus minimizing the passage aperture at bearing surfaces. It has previously been proposed to form oil passages in main journal and crankpins which exit at the end of the journal or pin adjacent the crank arms, and to form a diagonal oil passage through the crank arms which connects the journal and pin passages. To make the connection, the parts must be precisely indexed upon assembly to align each of the bearing passage and the crank pin passage with the diagonal passage in the crank arms.

SUMMARY OF THE INVENTION

The present invention is an assembled crankshaft with improved joints which are easy to assemble. The invention includes an oil passage arrangement for the assembled crankshaft which requires no special indexing upon assembly.

These and other features and advantages of the invention will be more fully understood from the following descriptions of certain specific embodiments of the invention taken with the accompanying drawings.

BRIEF DRAWING DESCRIPTION

In the drawings:

FIG. 1 is a side view of a crankshaft built according to the invention;

FIG. 2 is a cross-sectional view of a crank pin for the crankshaft of FIG. 1;

FIGS 3a and 3b are cross-sectional views of intermediate and end main journals for the crankshaft of FIG. 1;

FIG. 4 is an end view of a crank arms for the crankshaft of FIG. 1;

FIG. 5 is a side view of a seal plate for the crankshaft of FIG. 1;

FIG. 6 is a graphical presentation of the development of a trilobed configuration as used for the apertures of the crank arms of FIG. 4;

FIG. 7 is an isometric view of a portion of the crank arms of FIG. 4 showing details of a trilobed aperture according to the invention;

FIG. 8a is a cross-sectional view of a crank pin as assembled to crank arms according to the invention;

FIG. 8b is a cross-sectional view of a crank pin as assembled to crank arms according to the invention;

Corresponding reference characters indicate corresponding parts throughout the several views of the drawings.

DETAILED DESCRIPTION

Figure 9:
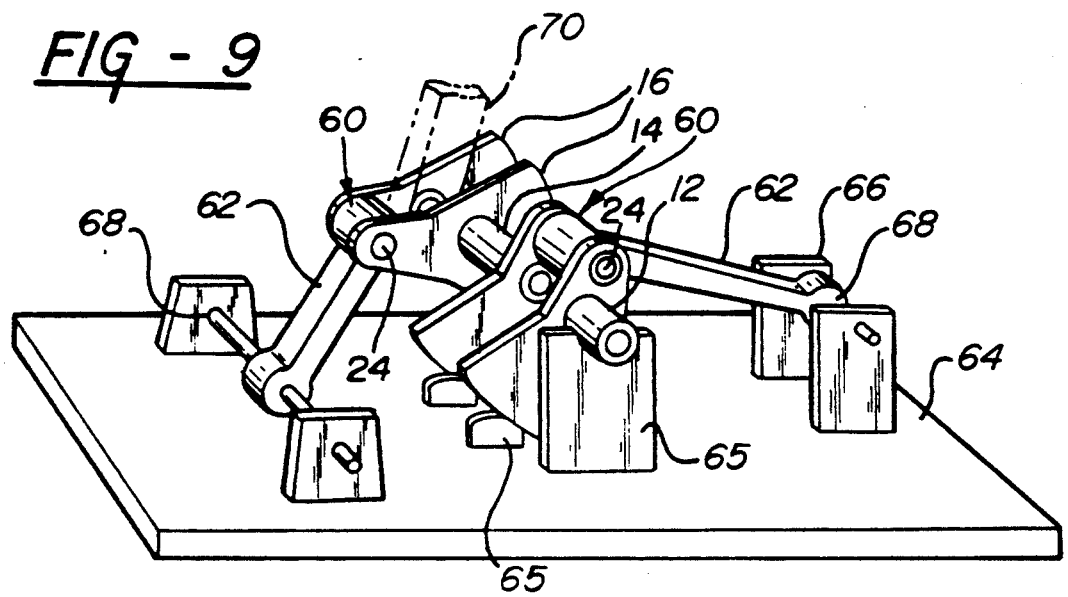
FIG. 9 is an isometric view of a crankshaft assembly fixture and a portion of a crankshaft illustrating an assembly method according to the invention.

Referring to FIGS. 1-5, a crankshaft 10 for a six cylinder two stroke engine comprises end main journals 12, two intermediate main journals 14, crank arms 16 coupled through axis center apertures 19 to ne end of each end journals 12 and both ends of intermediate main journals 14 as well as through off-axis apertures 22 to both ends of crank pins 24. Each crank arms 16 is circular and has a circumferential groove 26 for receiving a seal, not shown. Counterweights are carried on at least some of the crank arms. Additionally, a circular seal plate 28 is attached to each of the crank pins 24 midway between its supporting crank arms 16 and has a circumferential groove 26, also for receiving a seal. The seal plates 28 have circular off-axis apertures 20 for attachment to the crank pins 24 by a shrink fit. The various seals cooperate with circular opening of webs in the engine crankcase to separate the crankcase into compartments for managing the flow of intake air and exhaust.

For small two stroke engines which do not require a compartmentalized crankcase or for four stroke engines, the seal plates 28 and the grooved circular crank arms 16 are not necessary and conventionally shaped counterweights may be used instead. In either case, roller bearings and connecting rods are assembled to the crank pins 24 prior to assembly with the crank arms so that a one piece connecting rod and a non-split roller bearing cage can be used. Likewise, roller bearings are assembled to the main journals 14 prior to assembly. The surface of the crank pins 24 and the main journals 14,16 are hardened to 60-62 Rockwell C to serve as inner races of the roller bearings. Hardened thrust faces 30 on the crank arms and seal discs prevent the roller bearings from moving axially, and also guide the connecting rods. In two stroke engines the lubrication to the bearings is provided by a fine mist of oil carried into the crankcase by the air supply. In four stroke engines oil passages formed in the crankshaft between the main journals and the crank pins are coupled with an oil galley in the cylinder block for lubricating the crank pin bearings.

The main journals 12,14 and crank, pins, 24 are joined to apertures 18,22 in the crank arms by an improved form of an expansion technique known as "ballizing" which is explained in its fundamental form in the abovementioned U.S. Pat. No. 4,835,832 and which entails forming an aperture in each of a number of outer elements (such as cams) which aperture is lobular in cross section and has an uneven number of lobes, preferably three or five; inserting a tube through the apertures of the outer elements; holding the ends of the tube against axial elongation; and mechanically expanding the tube to fill the cross section of the apertures, thereby securing the outer elements to the tube. Preferably the mechanical expansion is performed by forcing a hardened ball through the tube, the ball being a few thousandths inch larger in diameter than the tube inner diameter. Reference may be had to the U.S. Pat. No. 4,835,832 for further details.

In FIG. 6 a graphical illustration, taken from our aforesaid U.S. Pat. No. 4,835,832 of the development of a trilobed figure is presented having an eccentricity 32 measured from a circle 34 defining the minimum radius of the trilobed perimeter 36. The developed perimeter 36 is made up of blended tangent swing radii in the form of a series of alternating long arcs 38 and short arcs 40 which are drawn from three equally spaced centers 42 spaced about the true center 44 of the figure. The result is that the perimeter has an over all uniform height or width 46 in any direction. For simplicity, this is generally referred to as a uniform diameter 46 although it should be understood that this uniform diameter dimension passes sequentially through each of three centers 42 and only passes through the true center 44 when the diameter is at the midpoints of two opposing long and short arcs 38,40. Thus each set of long and short arcs forms a lobe 48. The eccentricity 32 of each lobe is on the order of 0.010 to 0.020 inch, although a greater eccentricity may be used. The lobes 48 provide torque capacity to the ballized joint and splines may be added, as discussed below, to further enhance torque capacity.

The improved or second generation ballizing technique utilizes the lobed aperture described in FIG. 6 and adds some other features. First, the tube which extends through openings of all the elements is eliminated and each crank pin 24 or main journals 12,14 has an integral tubular extension which is inserted into the corresponding lobed aperture of the crank arms and expanded to form the joint. Thus the crank pin 24 of FIG. 2 has a surface hardened crank pin body portion 50 and two crank pin or joining end portions 52 of reduced diameter which are not hardened, while the intermediate main journals 14 of FIG. 3a has a hardened main journal portion 54 and two main journal end portions 56 of the same diameter as the main journal. Protion which are not hardened. The end main journal 12 of FIG. 3b has a hardened main journal body portion 53 with an internally threaded bore 55 and one non-hardened main journal end or joinings portion 57 of reduced diameter. It is apparent that either the crank pin or the main journal may have a reduced end portion or nonreduced end portion. A second improvement is that the mechanical expansion is selective, affecting only a portion of the tubular element through which the ball is passed. To carry out the selective expansion, the body portion 50 or 54 has a larger inner diameter than the end portions 52 or 56, and the balls 58 which pass through the crank pin or main journal is of intermediate size, being larger than the I.D. of the end portions and smaller than the I.D. of the body portions. A third improvement is that instead of effecting the expansion by a single pass of a ball, three balls of successively larger diameters are used sequentially to expand the end portions in stages, creating greater deformation with less force. A fourth improvement is in making undercuts such as circumferential or helical grooves in the aperture to resist axial movement when the metal of the end portion has been expanded into the undercut.

FIG. 7 shows a typical aperture 18,22 in a crank arms for receiving either a crank pin 24 or a main journal 14,16. The lobes 48 of the aperture are each provided with a few splines 49 extending parallel to the shaft axis. The lobe eccentricity and the spline form provide good torque capacity when assembled with the crank pin or main journal. The spline height may be the same dimension as the eccentricity. A circumferential groove 51 in the aperture has a depth of about 0.015 inch and a width of about 0.030 inch. Several grooves may be preferred to increase the axial strength. As shown in FIG. 8a which represents the crank pin 24 assembled to crank arms 16 without a seal plate, the crank pin end portion metal fills the groove 51 or grooves upon assembly to secure the joint against axial separation. The off-axis aperture is hardened to about 40 Rockwell C, while the crank pin end portion is not hardened to assure that the crank pin end portion metal will expand into conformity with the off-axis aperture 22. As indicated in FIGS. 8a and 8b, the undercut may comprise a helical groove 51 in the inner circumference of the off-axis aperture.

The crank pin 24 may have typical crank pin body portion 50 dimensions of 1.5 inch O.D. and 0.79 inch I.D., and crank pin end portion 52 O.D. of 1.25 inch and I.D. of 0.72 inch so that the crank pin end wall thickness is about 0.26 inch prior to assembly. After the crank pin end portions are inserted into the off-axis apertures 22 a first hardened ball 58 having a diameter of about 0.005 inch greater than the crank pin end portion I.D. is forced through the crank pin pin 24, and then a second and a third ball are successively forced through the crank pin, each ball 58 being about 0.005 inch greater in diameter than the previous ball, so that the crank pin end portions are progressively expanded into tight conformity with the off axis apertures. The crank pin body portion I.D. is larger than the largest ball so that it serves as a guide passage for the ball as it traverses from one crank pin end portion 52 to another but it offers no resistance to its movement. The intermediate main journal 14 may be larger in diameter so that its end portion 56 wall thickness is about 0.33 inch. The intermediate main journal end portions 56 are expanded after insertion into center apertures 18 by balls of successively greater diameters.

By using more than one ball 58 for expansion, greater deformation can be attained and lower forces are needed to push the ball through the end portions. By this arrangement it is possible to selectively expand a tubular element by the provision of an I.D. smaller than the balls where expansion is desired and a larger I.D. where expansion is not desired. Thus it is not required to expand both ends of a tubular shaft. The end main journal 12 are attached to the outer crank arms 16 by only one end main journals end 57, and thus only that one end portion has a small I.D. for expansion by a ball. It is evident then, that the small I.D. may be located wherever desired in the tubular shaft and may be intermediate the ends in addition to or instead of at an end.

In assembling a crankshaft 10, there are several options for the order of assembly of the parts. For example, the assembly may start at one end of the crankshaft and parts added in order of their location in the assembly, using a fixture to hold each part in position, and completing the joints by expansion of the end portions as each section, e.g. a crank pin 24 and its associated crank arms 16, is assembled. Alternatively, the parts can be placed in the fixture with end portions inserted into their respective apertures prior to completing the joints. Referring to FIG. 9, it is also possible to assemble subassemblies 60 of a crank pin 24, its connecting rod 62 (with roller bearings, not shown) and associated crank arms 16 with the joints completed and then combine the subassemblies by orienting the subassemblies 60 in a fixture 64 and installing the main journals 12,14. Locating details 65 engage various features of the crankshaft parts to establish correct orientation. The free ends 66 of the connecting rods 62 are held in fixed points by locating rods 68 thereby precisely controlling the relative angle of the crank pins 24. Even if the intermediate main journal 14 end portions are inserted in the center apertures 18 of the crank arms 16 they are not yet fixed and the crank pin 24 angles can be adjusted as required by the fixture 64. Then, when the subassemblies are properly oriented, the end portions of the main journals 12,14 are expanded by ballizing to finally complete the joints.

Figure 10:
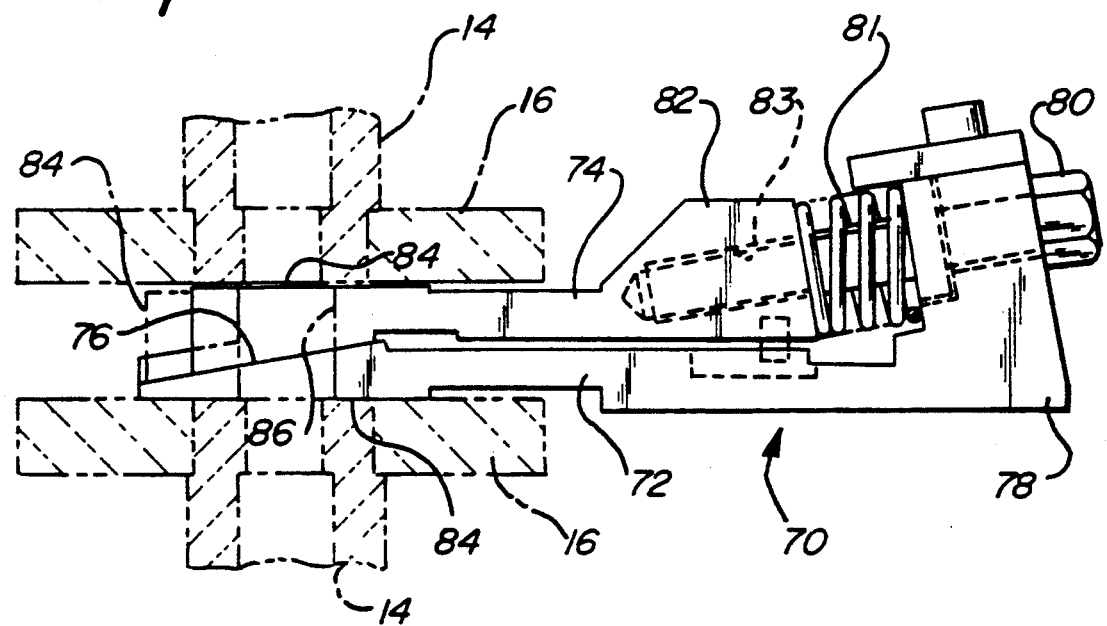
FIG. 10 is a side view of an assembly fixture used with the fixture of FIG. 9.

To ballize the main journal 12, 14, bearings while in the fixture 64 shown in FIG. 9, it is desirable to pass each ball 58 through all the main journal in a single pass. Since the main journal 12, 14 are, separated by axial spaces adjacent the crank pins 24, a fixture 70, shown in dashed lines in one such location, is provided to bridge the space and provide a passageway for the balls. Another function of such a fixture 70 is to transfer axial force from one main journal to another. This allows a clamping force for preventing axial growth of each main journal to be applied at each outboard end of the end main journal 12 and transmitted to the intermediate main journals 14. FIG. 10 shows the fixture 70 which comprises first and second plates 72 and 74 which are relatively slidable along an axis and which have at one end cooperating ramp or wedge faces 76. At the other end, the plate 72 has a laterally extending head 78 including an aperture for receiving a hex head bolt 80. The other plate 74 has a body 82 with an internally threaded bore 84 for receiving the threaded end of the bolt 80. The bolt 80 is positioned with its axis parallel to the ramp faces and by turning the bolt 80 the plates are caused to slide at the ramp faces and the relative position of the plates 72 and 74 is controlled. A spring 81 around the bolt and between the plate 74 and 78 urges the plate 74 in the release direction when the bolt 80 is loosened. (The bolt 80 is used in a prototype fixture 70; an air pressure operated linear actuator is preferred for a production fixture.) The outboard faces 84 of the plates 72,74 at the one end are parallel and remain so during the sliding action, and the spacing of the faces 84 changes. At the smallest spacing of the outboard faces 84, as shown in phantom lines, the fixture 70 is inserted into the space between the crank arms 16 in line with the apertures 18. At that position the bolt 80 is turned to increase the spacing of the faces 84 thereby expanding the fixture 70 tightly against the crank arms 16 and the ends of the intermediate main journals 14. Bores 86 in each of the plates 72,74 aligned with the axes of the main journals 12, 14 when installed, allow the passage of the balls 58 when they are passed through the main journals. Thus the bores 86 are larger than the balls 58 but are small enough to allow the faces 84 to engage the ends of the main journals 12,14 If such a fixture 70 is installed in each of the spaces between the main journals ends, a clamping force applied to the outer ends of the end main journals 12 will be exerted longitudinally through all the main journal 12,14 and the fixtures 70. The clamping force can be applied by mechanical or hydraulic apparatus like that shown in our U.S. Pat No. 4,835,832. The method of U.S. Ser. No. 07/753554, filed Sep. 3, 1991, titled "Method of Assembling a Shaft and Apertured Member" is especially well suited for fabricating the crankshaft 10.

It will be apparent that some of the crankshaft joints may be joined by ballizing and other joints may be joined by other methods. For example, the crank pin 24 ends may be ballized to the crank arms 16 and the main journals 12,14 may be press fit in the crank arms or vice versa. Alternatively, the main journals 12,14 crank arms 16 may be cast or forged as a unit and the crank pins 24 formed separately and joined by ballizing.

Figure 11:
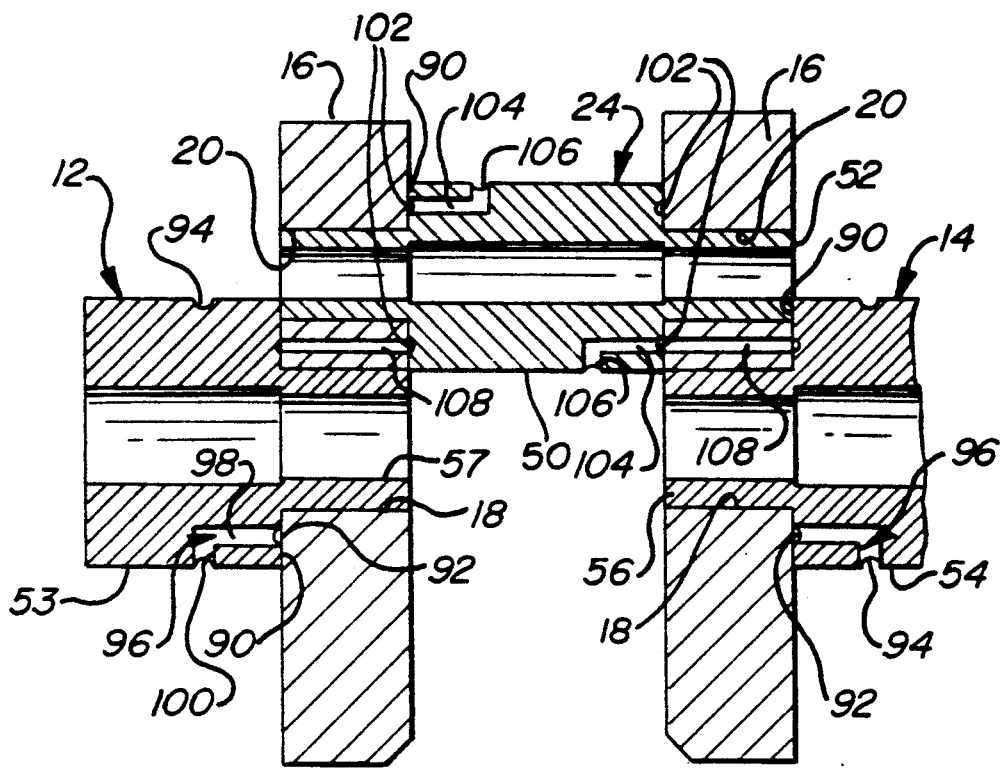
FIG. 11 is a cross-sectional view of a portion of a crankshaft incorporating oil passages according to the invention.
Figure 12:
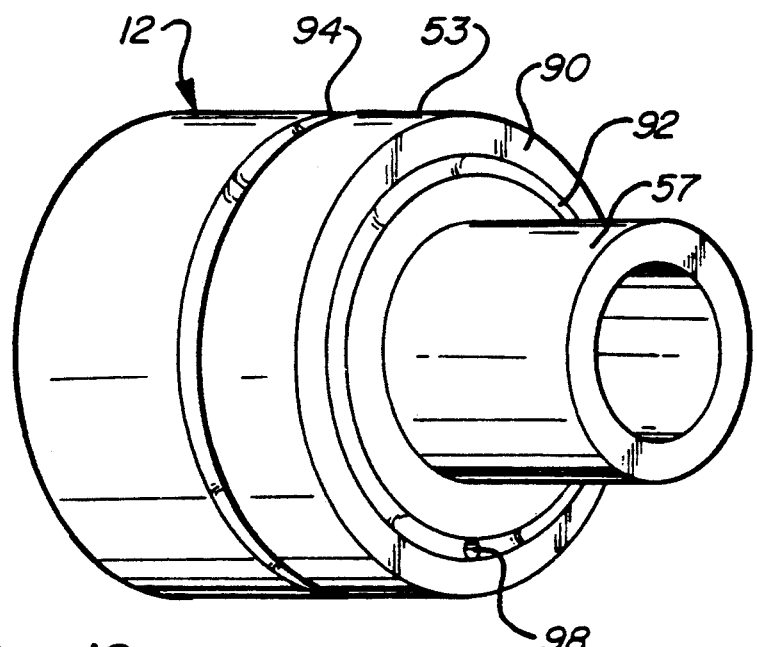
FIG. 12 is an isometric view of a journals of the FIG. 11 assembly.

An advantage to forming the crankshaft 10 from separate machined main journals 12,14 and crank pins 24 is an improved arrangement of oil passages in crankshafts for four stroke engines. As shown in FIGS. 11 and 12, a pair of crank arms 16 are connected by a crank pin 24 with crank pin end portions 52 in off-axis apertures 20, and main journals 12 and 14 have their respective main journal end portions 57 and 56 assembled into axial center apertures 18. The main journals 12, 14 the crank pin 24 have reduced diameter end portions and planar shoulders 90 at the interface of the reduced end portions and the body portions. An annular main journal groove 92 is formed in each shoulder 90 as main journal concentric with the axis of the main journal. Each annular groove 92 is closed on one side by the face of the adjacent crank arms 16 to define a closed annular passage. Each main journal 12,14 has a circumferential main journal groove 94 around the body main journal 54 or portion 53 which receives oil under pressure from cylinder block oil galleys, not shown. An internal main journal short passage 96 comprising a short bore 98 parallel with the main journal axis and a short radial bore main journal 100 interconnects the annular groove main journal 92 of each main journal with the respective circumferential main journal 94. Similarly, each shoulder 90 of a main journal 12,14 and is of the crank pin 24 has an annular groove crank pin 102, and an internal short crank pin passage 104 with parallel and radial runs connects the groove annular crank pin 102 with a port crank pin 106 on the surface of the crank pin. The respective annular grooves 92 and 102 overlap on opposite sides of the crank arms 16 and are interconnected by a bore counter weight 108 through the crank arms perpendicular to the face of the counterweight. If crankshaft design requires that the annular grooves 92 and 102 not overlap but by radially spaced, a diagonal bore crank arms 108 through the crank arms 16 may be used. In either event, oil supplied by the oil galley to the groove main journal 94 is fed crank arms annular crankpin through main journal passage 96, annular main journal groove 92, bore 108, groove 102 and crank pin passage 104 to the crank pin port 106 to lubricate the connecting rod bearing, not shown. Due to the annular grooves in 92,102 the shoulders 90, the bore crank arms 108 will intersect the annular grooves for any orientation of the main journals 12, 14 and the crank pins 24 thereby facilitating the assembly of the crankshaft parts.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A crankshaft assembled from individual preformed parts which are finish machined prior to assembly comprising:
    a plurality of main journals aligned on a crankshaft axis of rotation;
    a plurality of tubular crank pins between the main journals and radially spaced from the crankshaft axis, each crank pin having a surface hardened body portion and non-hardened end portions, the end portions each having a smaller inner diameter than the body portion;
    a plurality of crank arms each having a center aperture aligned on the said crankshaft axis for receiving an end portion of a main journal, the crank arms being securely attached to end portions of respective main journals for torque transmission between the main journals and the crank arms;
    an off-axis aperture in each crank arm adjoining a crank pin for receiving an end portion of a crank pin, each off-axis aperture having a lobular cross section with a plurality of lobes; and
    each end portion of a crank pin tightly conforming with the respective off-axis aperture for secure attachment to the respective crank arm.

2. The invention as defined in claim 2 wherein each said off-axis aperture has at least one circumferential undercut filled with metal of a crank pin end portion for resisting axial withdrawal of the crank pin end portion from the off-axis aperture.

3. The invention as defined in claim 1 wherein the center aperture of each crank arms has a hardened surface and a lobular cross section having a plurality of lobes and at least one spline in each lobe for withstanding torque; and
    each main journal having a surface hardened main journal body portion and non-hardened main journal end portions such that the main journal end portions fit in the center apertures in conformance with the center aperture shape, the main journal end portions each having a smaller inner diameter than the main journal body portion.

4. The invention as defined in claim 3 wherein each said center aperture has at least one circumferential undercut filled with metal of a main journal end portion for resisting axial withdrawal of the main journal end portion from the center aperture.

5. The invention as defined in claim 1 wherein each crank arm is circular with its center on the crankshaft axis of rotation;
    at least some of the crank pins carrying a seal plate which is circular with its center on the crankshaft axis of rotation, each seal plate having an off-center aperture fit over the respective crank pin and secured thereto; and
    each of the seal plates and the crank arms having a circumferential seal groove.

6. The invention as defined in claim 1 wherein each main journal and associated crank arm center aperture are assembled with a tightly fitting splined joint for transmitting torque about the crankshaft axis of rotation.

7. The invention as defined in claim 1 wherein each main journal and crank pin has a body protion and reduced diameter end portions defining shoulders at the interfaces of the body portion and the end portions such that the end portions fit in the center and off-axis apertures and the shoulders abut the crank arms;
    annular grooves formed on at least some of the shoulders of the main journals and crank pins such that annular oil passages are defined by the grooves and adjacent crank arm surfaces;
    oil passages formed in several main journals and crank pins in communication with the grooves and parallel to the crankshaft axis, and radial passages between the parallel oil passages and peripheral surfaces of the main journals and crank pins; and
    a passage in each crank arm for interconnecting the annular oil passages of main journals and crank pins sharing a common crank arm, whereby a continuous oil passage extends from the peripheral surface of each main journal to the peripheral surface of an adjoining crank pin.

8. The invention as defined in claim 7 wherein the passage in each crank arm is parallel to the crankshaft.

9. An assembled shaft comprising:
    a first member having an aperture with a hardened surface and a lobular cross section having a plurality of lobes; and
    a tubular shaft having a surface hardened body portion and a non-hardened joining portion, said joining portion having a smaller inner diameter than said body portion, said joining portion tightly conforming with said aperture for secure attachment to said first member.

10. The invention as defined in claim 9 wherein said aperture has intermediate its ends at least one circumferential above filled with metal of said tubular shaft for resisting axial withdrawal of said joining portion from said aperture.

11. The invention as defined in claim 9 wherein said aperture has at least one spline in at least one of said lobes for withstanding torque.

12. The invention as defined in claim 9 wherein said first member comprises a crank arm of a crankshaft, said aperture being aligned on the crankshaft axis of rotation, said tubular shaft comprising a main journal, said attachment of said joining portion to said aperture enabling torque transmission between said main journal and crank arm.

13. The invention as defined in claim 9 wherein said first member comprises a crank arm of a crankshaft, said aperture being radially spaced from the crankshaft, said aperture being radially spaced from the crankshaft axis of rotation, said tubular shaft comprising a crank pin.

14. A crankshaft assembled from individual preformed parts comprising:

crank arm having a center aperture aligned on a crankshaft axis of rotation and an off-axis aperture radially spaced from the crankshaft axis of rotation;

a crank pin radially spaced from said crankshaft axis of rotation, said crank pin having a body portion and a reduced diameter end portion defining a shoulder at the interface of said body and end portions, said end portion of said crank pin being received in said off-axis aperture so that said shoulder of said crank pin abuts said crank arm, said crank arm being securely attached to said end portion of said crank arm;

a main journal aligned on said crankshaft axis of rotation, said main journal having a body portion and a reduced diameter end portion defining a shoulder at the interface of said body and end portions, said end portion of said main journal being received in said center aperture so that said shoulder of said main journal abuts said crank arm, said crank arm being securely attached to said end portion of said main journal for torque transmission between said main journal and crank arm;

annular grooves formed on said shoulders so that annular oil passages are defined by said grooves and adjacent crank arm surfaces;

oil passages formed in said body portions in communication with said grooves and parallel to said crankshaft axis;

radial passages formed in said body portions between said parallel oil passages and peripheral surfaces of said body portions; and a passage in said crank arm for interconnecting said annular oil passages of said main journal and crank pin whereby a continuous oil passage extends from said peripheral surface of said main journal to said peripheral surface of said crank pin.

15. The invention as defined in claim 14 wherein said passage in said crank arm is parallel to said crankshaft axis.

* * * * *